US009122909B2

(12) United States Patent
Tian et al.

(10) Patent No.: US 9,122,909 B2
(45) Date of Patent: Sep. 1, 2015

(54) CARD READER, ELECTRONIC APPARATUS AND PROTECTION METHOD FOR MEMORY CARD

(75) Inventors: Xiyong Tian, Beijing (CN); Yinong Liu, Beijing (CN); Lingchang Li, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 372 days.

(21) Appl. No.: 13/556,708

(22) Filed: Jul. 24, 2012

(65) Prior Publication Data

US 2013/0027869 A1 Jan. 31, 2013

(30) Foreign Application Priority Data

Jul. 27, 2011 (CN) .......................... 2011 1 0211895

(51) Int. Cl.
*G06K 7/00* (2006.01)
*G06K 13/08* (2006.01)

(52) U.S. Cl.
CPC .......... *G06K 7/0021* (2013.01); *G06K 13/0825* (2013.01); *G06K 13/0831* (2013.01); *G06K 13/0856* (2013.01)

(58) Field of Classification Search
USPC .......................................... 235/439, 479, 486
See application file for complete search history.

(56) References Cited

U.S. PATENT DOCUMENTS

| 5,823,828 A | 10/1998 | Bricaud et al. |
| 2004/0009690 A1 | 1/2004 | Natori |
| 2006/0143352 A1 | 6/2006 | Park |
| 2008/0212291 A1 | 9/2008 | Uusimaki et al. |

FOREIGN PATENT DOCUMENTS

| CN | 1471048 | 1/2004 |
| WO | 2006/120304 A1 | 11/2006 |

OTHER PUBLICATIONS

International Preliminary Report on Patentability for corresponding International Application No. PCT/IB2012/001437 dated Feb. 6, 2014.
International Search Report and Written Opinion of the International Searching Authority for corresponding International Application No. PCT/IB2012/001437 dated Jan. 18, 2013.
Chinese Office Action dated Dec. 29, 2014 related to corresponding Chinese Patent Application 20110211895.X.

*Primary Examiner* — Daniel Hess
(74) *Attorney, Agent, or Firm* — Renner, Otto, Boisselle & Sklar, LLP.

(57) ABSTRACT

The embodiments of the present invention provide a card reader, electronic apparatus and protection method for memory card. The card reader comprises: a card slot having an accommodation space for accommodating a memory card, with parallel guiding slots being arranged on the left side and right side walls of the card slot; and a cover arranged on the card slot and being slidable on the card slot via the guiding slots. With the embodiments of the present invention, the delay time for stopping the read-write protection may be increased, the memory card may be protected in time, and the back repair rate of the memory card may be reduce.

14 Claims, 7 Drawing Sheets

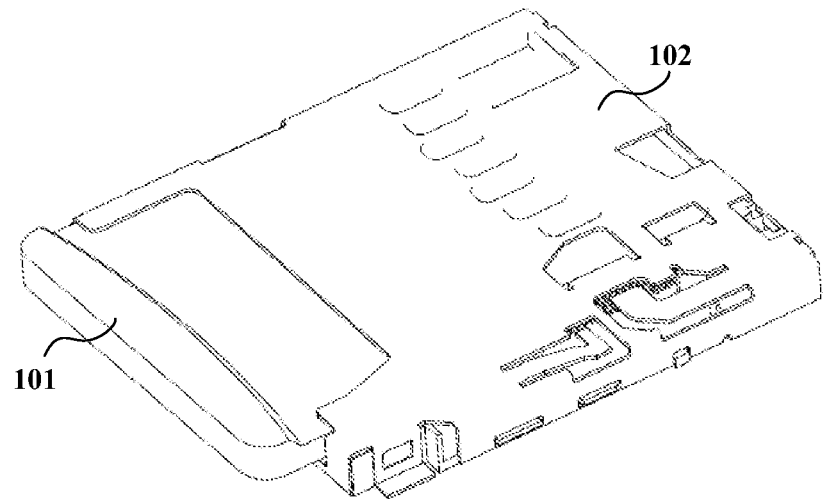
Fig. 1 – PRIOR ART
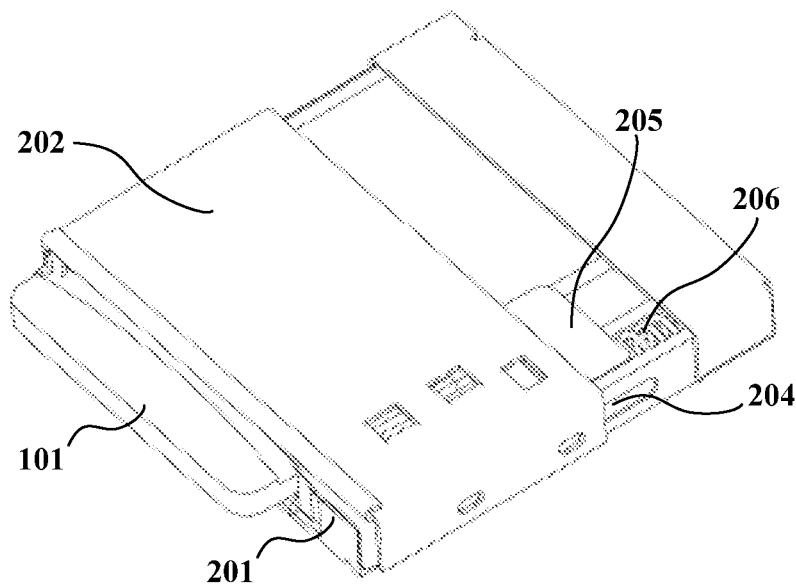
Fig. 2

CARD READER, ELECTRONIC APPARATUS AND PROTECTION METHOD FOR MEMORY CARD

TECHNICAL FIELD

The present invention relates to a card reader and in particular to a card reader, electronic apparatus and protection method for memory card.

BACKGROUND ART

A memory card uses a flash memory as a storage medium and consumes much less power in reading and writing data. Therefore, it is widely used in portable information devices, such as a mobile phone, and a personal digital assistant (PDA), etc. The existing memory cards may include a secure digital (SD) card, a subscriber identity module (SIM) card, and a multi-media card (MMC), etc.

Currently, a memory card can store more and more information and has become an indispensable part of a portable information device. For example, in a mobile phone using the Android Operating System, an SD card becomes centralized part of the whole storage system. In a next-generation standard, there will exist cases where the information of the applications is moved to the SD card from the internal flash memory, or the information is moved to the internal flash memory from the SD card.

A memory card may be connected to other parts of a portable information device via a card reader. FIG. 1 is a schematic diagram showing that a memory card is inserted into a card reader in the prior art. As shown in FIG. 1, when a memory card is inserted into a card reader, a user may press the memory card 101, such that a locking component in the card reader 102 locks the memory card 101, so as to fix the memory card 101 in the card reader 102. When the memory card is taken out, the user may press the memory card 101 again, such that the locking component in the card reader 102 unlocks the memory card 101, so as to eject the memory card 101 from the card reader 102.

SUMMARY OF THE INVENTION

In the implementation of the embodiments of the present invention, this inventor found that following defect exists in the prior art. The card reader is not provided with a protection device for read-write protection. When the memory card is reading or writing data, the data will be lost if the memory card is moved, and the memory card may be damaged, increasing the back repair rate of the memory card.

The embodiments of the present invention provide a card reader, electronic apparatus and protection method for memory card, with the object being to stop the read-write operation of the memory card when the cover of the card reader is abnormal, so as to protect the memory card in time.

According to one aspect of the embodiments of the present invention, there is provided a card reader, including:

a card slot having an accommodation space for accommodating a memory card, with parallel guiding slots being arranged on the left side and right side walls of the card slot; and a cover arranged on the card slot and being slidable on the card slot via the guiding slots.

According to another aspect of the embodiments of the present invention, the cover includes left and right side walls opposite to each other and a top wall arranged between the left and right side walls, and sliding blocks are arranged on the left and right side walls of the cover, the sliding blocks being embedded into the guiding slots, such that the cover is slidable along the guiding slots.

According to a further aspect of the embodiments of the present invention, the card reader further includes:

a locking device arranged in the accommodation space and connected to the cover for locking or unlocking the memory card through the sliding of the cover.

According to still another aspect of the embodiments of the present invention, the card reader further includes:

an elastic part arranged in the accommodation space in parallel with the guiding slots, with one end of the elastic part being connected to the locking device, and the other end being connected to the card slot.

According to still another aspect of the embodiments of the present invention, the cover has a metal shielded structure.

According to still another aspect of the embodiments of the present invention, the card reader further includes:

contact points arranged on the card slot for detecting whether the cover slides along the guiding slots.

According to still another aspect of the embodiments of the present invention, the number of the contact points is at least two including a first contact point, the at least two contact points being electrically disconnected when the cover slides along the guiding slots, such that the voltage of the first contact point changes.

According to still another aspect of the embodiments of the present invention, there is provided an electronic apparatus, including the card reader as stated above, the electronic apparatus further including:

a state judging unit to judge whether the cover of the card reader is contacted, or whether the cover of the card reader slides along the guiding slots on the card reader; and a read-write controlling unit to stop the read-write operation of the memory card when it is judged by the state judging unit that the cover is contacted, or the cover slides along the guiding slots.

According to still another aspect of the embodiments of the present invention, the cover has a metal shielded structure, and the state judging unit includes:

a capacitive touch sensor connected to the metal shielded structure to sense capacitance via the metal shielded structure;

a capacitance detecting unit to detect the capacitance of the capacitive touch sensor; and a state determining unit to determine that the cover of the card reader is contacted when it is detected by the capacitance detecting unit that the capacitance of the capacitive touch sensor is greater than a predetermined capacitance.

According to still another aspect of the embodiments of the present invention, the card reader has at least two contact points to detect whether the cover slides, and the state judging unit includes:

a voltage detecting unit electrically connected to a first contact point of the at least two contact points to detect whether the voltage of the first contact point changes; and a state determining unit to determine that the cover slides along the guiding slots when it is detected by voltage detecting unit that the voltage of the first contact point changes.

According to still another aspect of the embodiments of the present invention, there is provided a protection method for memory card, applicable to the card reader stated above, the protection method including:

a state judging step: judging whether the cover of the card reader is contacted, or whether the cover of the card reader slides along the guiding slots on a card slot of the card reader;

a read-write controlling step: stopping the read-write operation to the memory card when it is judged that the cover is contacted, or the cover slides along the guiding slots on a card slot of the card reader; and a cover sliding step: sliding the cover of the card reader along the guiding slots on the card slot of the card reader.

According to still another aspect of the embodiments of the present invention, after the cover sliding step, the protection method further includes:

a memory card ejecting step: unlocking the memory card by a locking device arranged on the card slot, so as to eject the memory card.

According to still another aspect of the embodiments of the present invention, after the memory card ejecting step, the protection method further includes:

a cover returning step: pushing the locking device and the cover by the pressure of an elastic part arranged on the card slot, such that the cover returns along the guiding slots.

According to still another aspect of the embodiments of the present invention, the state judging step includes:

a capacitance detecting step: detecting the capacitance of a capacitive touch sensor via the metal shielded structure of the cover; and a state determining step: determining that the cover of the card reader is contacted when it is detected that the capacitance of the capacitive touch sensor is greater than a predetermined capacitance.

According to still another aspect of the embodiments of the present invention, the state judging step includes:

a voltage detecting step: detecting whether the voltage of the first contact point on the card reader changes; and a state determining step: determining that the cover slides along the guiding slots when it is detected that the voltage of the first contact point changes.

Advantages of the embodiments of the present invention exist in: stopping the read-write operation of the memory card when it is detected that the cover of the card reader is contacted, or the cover of the card reader slides along the guiding slots; and the cover of the card reader slides a distance before the memory card is taken out, which may protect the memory card in time and reduce the back repair rate of the memory card.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings:

FIG. 1 is a schematic diagram showing that a memory card is inserted into a card reader in the prior art;

FIG. 2 is a schematic diagram showing the structure of the card reader of the embodiments of the present invention;

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording. In this embodiment, the memory card may be an SD card, but it is not limited thereto, and other types of memory cards may be used.

Figure 3:
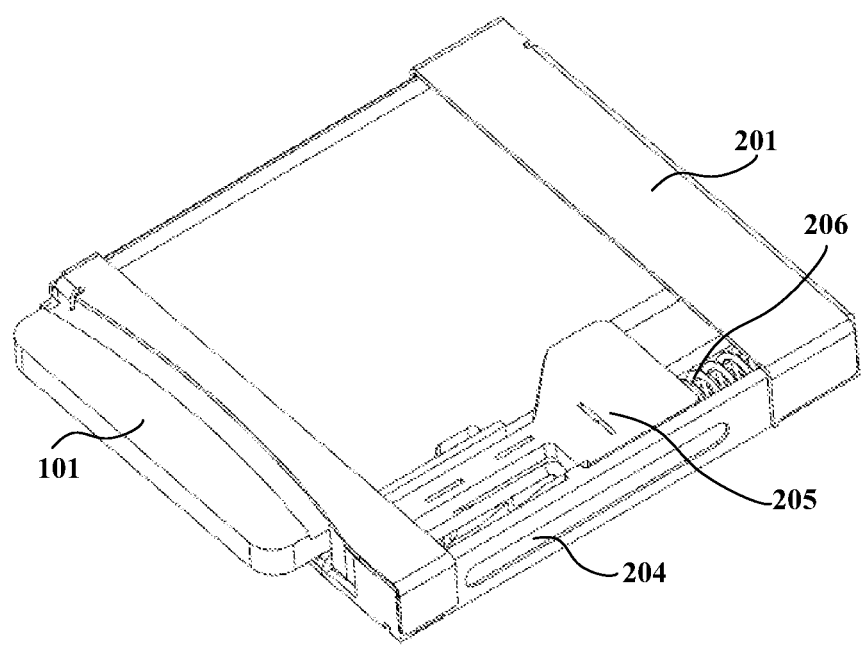
FIG. 3 is a schematic diagram showing a card slot of the embodiments of the present invention with a memory card being inserted.
Figure 4:
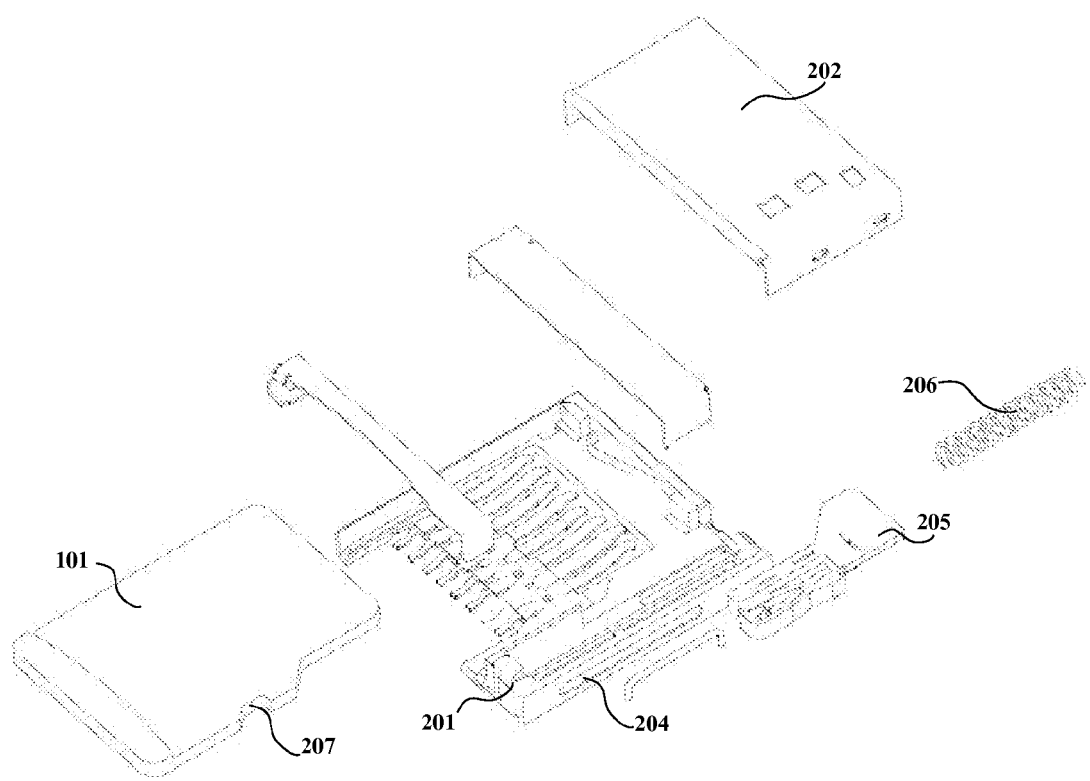
FIG. 4 is a perspective exploded view of the card reader of the embodiments of the present invention.

The embodiments of the invention provide a card reader. FIG. 2 is a schematic diagram showing the structure of the card reader of the embodiments of the present invention, FIG. 3 is a schematic diagram showing a card slot of the embodiments of the present invention with a memory card being inserted, and FIG. 4 is a perspective exploded view of the card reader of the embodiments of the present invention. As shown in FIGS. 2, 3 and 4, the card reader includes a card slot 201 and cover 202.

The card slot 201 has an accommodation space for accommodating a memory card 101, with parallel guiding slots (see 204, and the other guiding slot is not shown) being arranged on the left side and right side walls of the card slot 201; and the cover 202 is arranged on the card slot 201 and is slidable on the card slot 201 via the guiding slots.

As shown in FIGS. 2, 3 and 4, the card slot 201 may include left and right side walls opposite to each other and a bottom wall arranged between the left and right side walls, with an accommodation space being formed between the left and right side walls and the bottom wall, and the memory card 101 being capable of being inserted into the accommodation space. Contact pins (not shown) are arranged in the accommodation space and the conductive pins of the memory card 101 may be electrically connected to the contact pins in the accommodation space after the memory card 101 is inserted into the accommodation space.

As shown in FIGS. 2, 3 and 4, parallel guiding slots are arranged on the left and right side walls of the card slot 201. The guiding slots may be arranged at the outer sides of the left and right side walls of the card slot 201 and positioned at the middle parts of the left and right side walls, with a length of about ½ of the length of the left and right side walls. However, it is not limited thereto, and the positions and lengths of the guiding slots may be determined as actually demanded.

As shown in FIGS. 2, 3 and 4, the cover 202 is arranged on the card slot 201 and may include left and right side walls opposite to each other and a top wall arranged between the left and right side walls. Sliding blocks may be arranged on the left and right side walls of the cover 202, the sliding blocks being embedded into the guiding slots, such that the cover 202 may be slidable along the guiding slots.

The sliding blocks may be arranged at the inner sides of the left and right side walls of the cover 202, with two sliding blocks being at each wall, and the sliding blocks may be of a cylindrical shape. However, it is not limited thereto, and the positions, numbers and shapes of the sliding blocks may be determined as actually demanded.

As shown in FIGS. 2, 3 and 4, the card reader may further include a locking device 205. The locking device 205 is arranged in the accommodation space, fixedly connected to the cover 202 and may slide together with the cover 202. When the cover 202 does not slide, the locking device 205 may lock the memory card 101; and when the cover 202 slides forward, the locking device 205 may unlock the memory card 101.

For example, the locking device 205 may have a projection (not shown) which may be embedded into a corresponding recess 207 of the memory card 101. When the cover 202 does not slide, the locking device 205 may cause the projection to be embedded in to recess 207, thereby locking the memory card 101; and when the cover 202 slides forward for a certain distance, the locking device 205 may cause the projection to be disengaged from the recess 207, thereby unlocking the memory card 101.

In this way, the locking device 205 may lock or unlock the memory card 101 through the sliding of the cover 202. It should be noted that what is described above is illustrative only and it is not limited thereto, and particular implementation of the locking device may be determined as actually demanded.

As shown in FIGS. 2, 3 and 4, the locking device 205 may further include an elastic part 206. The elastic part 206 may be arranged in the accommodation space in parallel with the guiding slots and connected to the locking device 205.

In particular, as shown in FIGS. 2, 3 and 4, a shaft (not shown) may be arranged closed to the right side wall of the card slot 201, with the shaft being parallel to the left and right side walls of the card slot 201, and its two ends being fixed to the card slot 201. The elastic part 206 is arranged on the shaft, with one end of the elastic part 206 being fixedly connected to the locking device 205, and other end being fixed to the card slot 201. Hence, when the cover 202 slides forward along the guiding slots, the elastic part 206 may be pressed and thus, a force is generated; thereafter, the cover 202 may return back to the original position along the guiding slots under the pressure of the elastic part 206.

Figure 5:
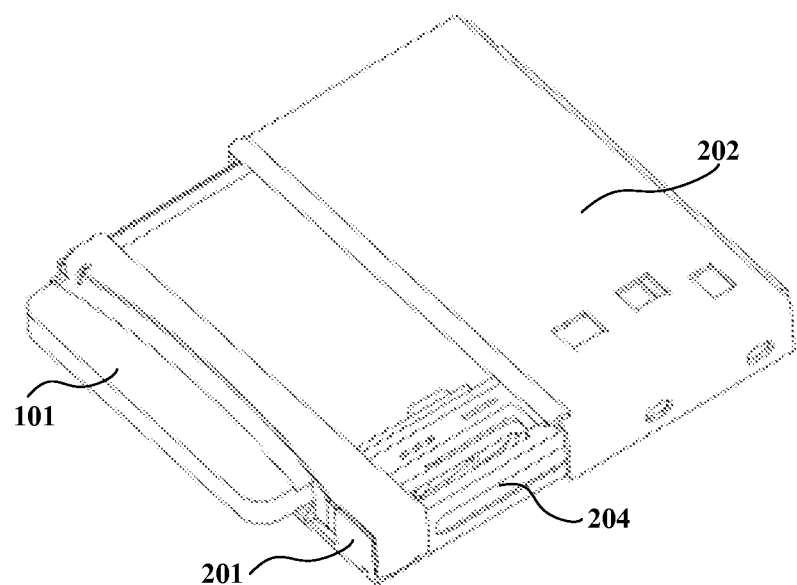
FIG. 5 is a schematic diagram showing the state of the card reader of the embodiments of the present invention after the cover is pushed.

FIG. 2 further shows a state of the card reader of the embodiments of the present invention before the cover is pushed, and FIG. 5 is a schematic diagram showing the state of the card reader of the embodiments of the present invention after the cover is pushed. As shown in FIGS. 2 and 5, different from the design of an existing card reader, the card reader of the present invention may lock or unlock the memory card through the position of the cover after the memory card is inserted.

In this embodiment, whether the cover is abnormal may be judged after the memory card is inserted and before the cover slides, and the read-write operation to the memory card may be stopped if the cover is abnormal, thereby efficiently protecting the memory card. The abnormality of the cover includes the cover's being contacted by a user, or the cover's sliding along the guiding slots on the card reader, etc.

In an embodiment, the cover 202 has a metal shielded structure. Whether a finger touches the cover 202 may be detected before stopping the read-write operation to the memory card, so as to further improve the detection accuracy.

Capacitance detection may be conducted by a capacitive touch sensor and a capacitance detecting unit. The capacitive touch sensor and the capacitance detecting unit may be integrated into the card slot 201, or may be integrated into an electronic apparatus connected to the card reader.

In another embodiment, the card reader may further include contact points arranged on the card slot 201 to detect whether the cover 202 slides along the guiding slots.

In specific implementation, the number of the contact points is at least two, including a first contact point. The at least two contact points may be electrically connected when the cover 202 is closed and may be electrically disconnected when the cover 202 slides along the guiding slots, such that the voltage of the first contact point changes, thereby detecting whether the cover 202 slides along the guiding slots.

It should be noted that the above is only explanation of how to judge whether the cover is abnormal; however, it is not limited thereto, and other embodiments may be adopted as actually demanded, for example, a mechanical structure may also be used to judge whether the cover slides. How to conduct the capacitance detection and the voltage detection is as described in the following.

Figure 6:
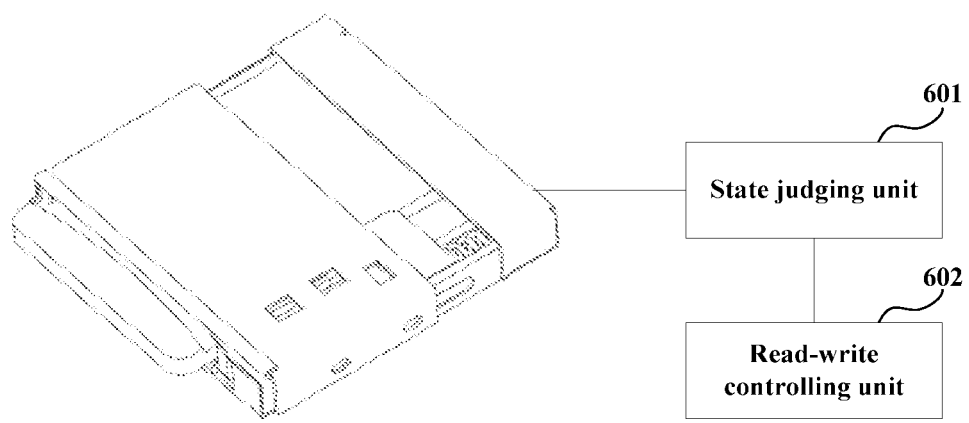
FIG. 6 is a schematic diagram showing a principle of the electronic apparatus of the embodiments of the present invention.

The embodiments of the present invention further provide an electronic apparatus including the card reader as described above. FIG. 6 is a schematic diagram showing the principle of the electronic apparatus of the embodiments of the present invention. As shown in FIG. 6, the electronic apparatus may further include a state judging unit 601 and a read-write controlling unit 602.

The state judging unit 601 is used to judge whether the cover of the card reader is contacted, or whether the cover of the card reader slides along the guiding slots on the card reader; and the read-write controlling unit 602 is used to stop the read-write operation of the memory card when it is judged by the state judging unit 601 that the cover is contacted, or the cover slides along the guiding slots.

In an embodiment, the cover has a metal shielded structure, and the state judging unit 601 may specifically include a capacitive touch sensor, a capacitance detecting unit and a state determining unit.

The capacitive touch sensor is connected to the metal shielded structure to sense capacitance via the metal shielded structure; the capacitance detecting unit is used to detect the capacitance of the capacitive touch sensor; and the state determining unit is used to determine that the cover of the card reader is contacted when it is detected by the capacitance detecting unit that the capacitance of the capacitive touch sensor is greater than a predetermined capacitance.

In implementation, when a finger of the user touches the metal shield structure of the cover 202, the electrical field of the human body will cause a capacitance to be formed between the finger and the surface of the metal shielded structure, since the skin tissue of a human body is full of conductive electrolyte. When the finger does not touch the metal shielded structure, the touch sensor does not detect the generated capacitance. In addition, the value of the predetermined capacitance may also be determined according to an actual empirical value.

In another embodiment, the card reader has at least two contact points for detecting whether the cover slides, wherein the at least two contact points include a first contact point. The state judging unit 601 may include a voltage detecting unit and a state determining unit.

The voltage detecting unit is electrically connected to the first contact point to detect whether the voltage of the first contact point changes; and the state determining unit is used to determine that the cover slides along the guiding slots when it is detected by voltage detecting unit that the voltage of the first contact point changes.

In implementation, a first contact point and a second contact point may be arranged on the card slot 201 and the cover 202 may be formed of a conductive metal. Thus, when the cover 202 is closed, the first contact point and the second contact point may be electrically connected via the cover 202; and when the cover 202 is moved, the first contact point and the second contact point are electrically disconnected.

Furthermore, the first contact point may be connected to a resistor, and the second contact point may be grounded; one end of the resistor is connected to a predetermined voltage, and the other end is connected to the first contact point. When the cover 202 is moved, the first contact point and the second contact point are electrically disconnected, the voltage of the second contact point is zero, and the voltage of the first contact point is the predetermined voltage. When the cover 202 is closed, the first contact point and the second contact point is electrically connected, the voltage of the second contact point is zero, and the voltage of the first contact point may be reduced to zero or approximate zero under the effect of the resistor. Thus, whether the cover slides along the guiding slots or not may be determined by detecting the change of the voltage of the first contact point.

What is described above is just exemplary explanation taking two contact points as an example; however, it is not limited thereto, and more contact pointed may be arranged to further improve the precision of detection.

It can be seen from the above embodiment that the read-write operation the memory card may be stopped by detecting that the cover of the card reader is contacted or the cover slides along the guiding slots; and the cover of the card reader slides a distance before the memory card is taken out, which may protect the memory card in time and reduce the back repair rate of the memory card.

Figure 7:
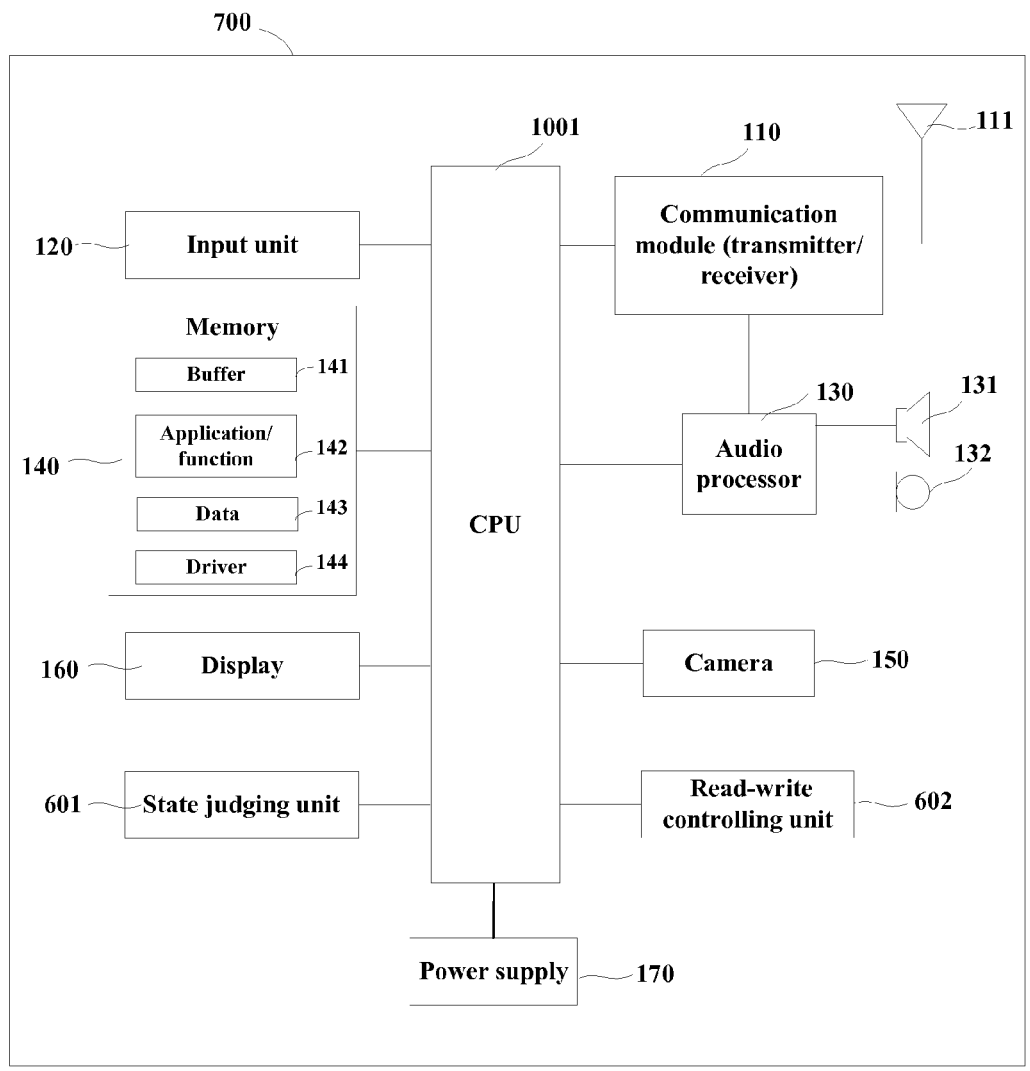
FIG. 7 is a schematic block diagram of the systematic composition of the electronic apparatus of the embodiments of the present invention.

FIG. 7 is a schematic block diagram of the systematic composition of the electronic apparatus 700 of the embodiments of the present invention, in which the above-described state judging unit 601 and the read-write controlling unit 602 are included. Such a figure is illustrative only, and other types of structures may be used to supplement or replace this structure, so as to realize the telecommunications function or other functions.

As shown in FIG. 7, the electronic apparatus 700 includes a central processing unit 1001, a communication module 110, an input unit 120, an audio processing unit 130, a memory 140, a camera 150, a display 160, a power supply 170, the state judging unit 601 and the read-write controlling unit 602.

The read-write controlling unit 602 and the state judging unit 601 may be connected directly, and may be connected via the central processing unit 1001 shown in FIG. 7. The read-write controlling unit 602 may also be integrated into the central processing unit 1001.

The central processing unit 1001 (sometimes referred to as a controller or control, which may include a microprocessor or other processor devices and/or logic devices) receives input and controls every components and operations of the electronic apparatus 700. The input unit 120 provides input to the central processing unit 1001. The input unit 120 is, for example, a key or a touch input device. The camera 150 is used to take image data and provide the taken image data to the central processing unit 1001, for use in a conventional manner, such as storage, and transmission, etc.

The power supply 170 is used to supply electric power to the electronic apparatus 700. The display 160 is used to display the display objects, such as images and characters. The display may be, for example, an LCD display, but it is not limited thereto.

The memory 140 is coupled to the central processing unit 1001. The memory 140 may be a solid-state memory, such as a read-only memory (ROM), a random access memory (RAM), and a SIM card, etc. It may also be such a memory that stores information when the power is interrupted may be optionally erased and provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the flow of the operation of the electronic apparatus 700 via the central processing unit 1001.

The memory 140 may further include a data storing portion 143 used to store data, such as a contact person, digital data, pictures, voices and/or any other data used by the electronic apparatus 700. A driver storing portion 144 of the memory 140 may include various types of drivers of the electronic apparatus 700 for the communication function and/or for executing other functions (such as application of message transmission, and application of directory, etc.) of the electronic apparatus 700.

The communication module 110 is a transmitter/receiver 110 transmitting and receiving signals via an antenna 111.

The communication module (transmitter/receiver) 110 is coupled to the central processing unit 1001 to provide input signals and receive output signals, this being similar to the case in a conventional mobile phone.

A plurality of communication modules 110 may be provided in the same electronic apparatus for various communication technologies, such a cellular network module, a Bluetooth module, and/or wireless local network module, etc. The communication module (transmitter/receiver) 110 is also coupled to a loudspeaker 131 and a microphone 132 via the audio processing unit 130, for providing audio output via the loudspeaker 131 and receiving the audio input from the microphone 132, thereby achieving common telecommunications functions. The audio processing unit 130 may include any appropriate buffers, decoders, and amplifiers, etc. The audio processing unit 130 is further coupled to the central processing unit 1001, thereby enabling the recording of voices in this device via the microphone 132 and playing the voices stored in this device via the loudspeaker 131.

Figure 8:
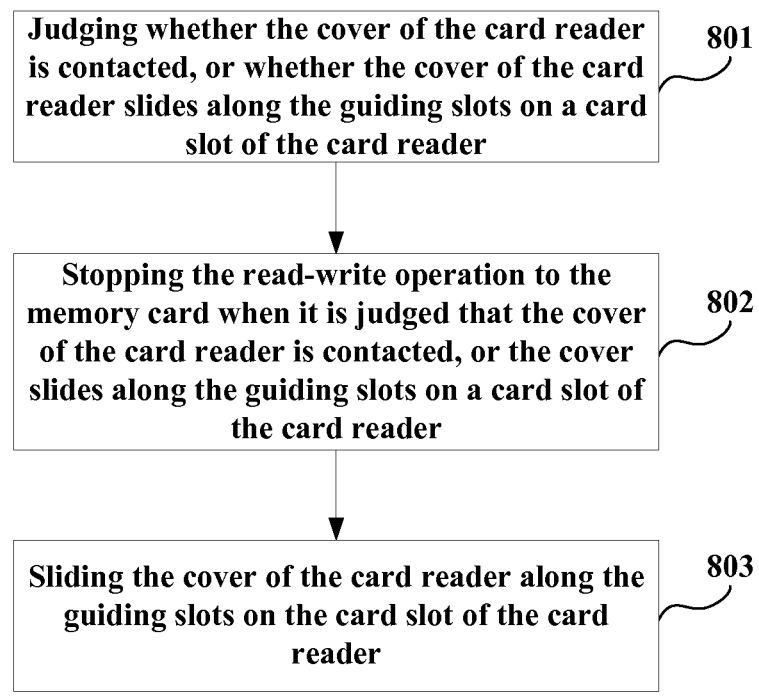
FIG. 8 is a flowchart of the protection method for memory card of the embodiments of the present invention.

The embodiments of the present invention further provide a protection method for memory card, applicable to the card reader as stated above. FIG. 8 is a flowchart of the protection method for memory card of the embodiments of the present invention. As shown in FIG. 8, the protection method includes:

a state judging step 801: judging whether the cover of the card reader is contacted, or whether the cover of the card reader slides along the guiding slots on the card slot of the card reader;

a read-write controlling step 802: stopping the read-write operation of the memory card when it is judged that the cover is contacted, or the cover slides along the guiding slots on a card slot of the card reader; and a cover sliding step 803: sliding the cover of the card reader along the guiding slots on the card slot of the card reader.

Figure 9:
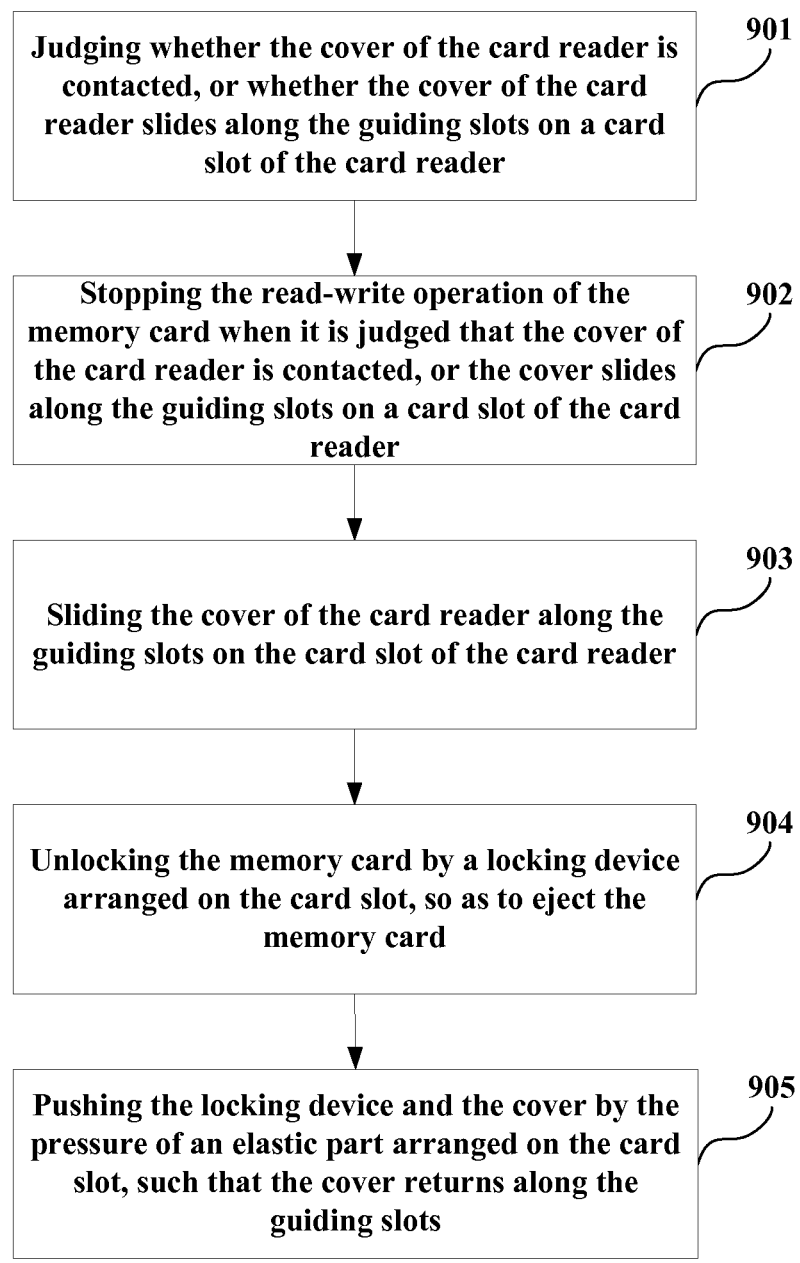
FIG. 9 is another flowchart of the protection method for memory card of the embodiments of the present invention.

FIG. 9 is another flowchart of the protection method for memory card of the embodiments of the present invention. As shown in FIG. 9, the protection method includes:

a state judging step 901: judging whether the cover of the card reader is contacted, or whether the cover of the card reader slides along the guiding slots on a card slot of the card reader;

a read-write controlling step 902: stopping the read-write operation of the memory card when it is judged that the cover of the card reader is contacted, or the cover slides along the guiding slots on a card slot of the card reader; and a cover sliding step 903: sliding the cover of the card reader along the guiding slots on the card slot of the card reader.

As shown in FIG. 9, after the step 903, the protection method may further include:

a memory card ejecting step 904: unlocking the memory card by a locking device arranged on the card slot, so as to eject the memory card.

As shown in FIG. 9, after the step 904, the protection method further includes:

a cover returning step 905: pushing the locking device and the cover by the pressure of an elastic part arranged on the card slot, such that the cover returns along the guiding slots.

In an embodiment, wherein the state judging step 901 may specifically include:

a capacitance detecting step: detecting the capacitance of a capacitive touch sensor via a metal shielded structure of the cover; and a state determining step: determining that the cover of the card reader is contacted when it is detected that the capacitance of the capacitive touch sensor is greater than a predetermined capacitance.

In another embodiment, the state judging step 901 may specifically include:

a voltage detecting step: detecting whether the voltage of the first contact point on the card reader changes; and a state determining step: determining that the cover slides along the guiding slots when it is detected that the voltage of the first contact point changes.

It can be seen from the above embodiment that the read-write operation to the memory card may be stopped by detecting that the cover of the card reader is contacted or the cover slides along the guiding slots; and the cover of the card reader slides a distance before the memory card is taken out, which may protect the memory card in time and reduce the back repair rate of the memory card.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A card reader, comprising:
    a card slot having an accommodation space for accommodating a memory card, with parallel guiding slots being arranged on the left side and right side walls of the card slot;
    a cover arranged on the card slot and being slidable on the card slot via the guiding slots; and
    a locking device arranged in the accommodation space and fixedly connected to the cover for locking or unlocking the memory card through sliding of the cover, wherein sliding of the cover relative to the accommodation space produces a corresponding sliding of the locking device relative to the accommodation space.

2. The card reader according claim 1, wherein the cover comprises left and right side walls opposite to each other and a top wall arranged between the left and right side walls, and
    sliding blocks are arranged on the left and right side walls of the cover, the sliding blocks being embedded into the guiding slots, such that the cover is slidable along the guiding slots.

3. The card reader according claim 1, wherein the cover has a metal shielded structure.

4. The card reader according claim 1, wherein the card reader further comprises:
    contact points arranged on the card slot for detecting whether the cover slides along the guiding slots.

5. The card reader according claim 4, wherein the number of the contact points is at least two comprising a first contact point, the at least two contact points being electrically disconnected when the cover slides along the guiding slots, such that the voltage of the first contact point changes.

6. An electronic apparatus, comprising the card reader as claimed claim 1, the electronic apparatus further comprising:
    a state judging unit to judge whether the cover of the card reader is contacted, or whether the cover of the card reader slides along the guiding slots on the card reader; and
    a read-write controlling unit to stop the read-write operation to the memory card when it is judged by the state judging unit that the cover is contacted, or the cover slides along the guiding slots.

7. The electronic apparatus according claim 6, wherein the cover has a metal shielded structure, and the state judging unit comprises:
    a capacitive touch sensor connected to the metal shielded structure to sense capacitance via the metal shielded structure;
    a capacitance detecting unit to detect the capacitance of the capacitive touch sensor; and
    a state determining unit to determine that the cover of the card reader is contacted when it is detected by the capacitance detecting unit that the capacitance of the capacitive touch sensor is greater than a predetermined capacitance.

8. The electronic apparatus according claim 6, wherein the card reader has at least two contact points to detect whether the cover slides, and the state judging unit comprises:
    a voltage detecting unit electrically connected to a first contact point of the at least two contact points to detect whether the voltage of the first contact point changes; and
    a state determining unit to determine that the cover slides along the guiding slots when it is detected by voltage detecting unit that the voltage of the first contact point changes.

9. A protection method for memory card, applicable to the card reader as claimed in claim 1, the protection method comprising:
    a state judging step: judging whether the cover of the card reader is contacted, or whether the cover of the card reader slides along the guiding slots on a card slot of the card reader;
    a read-write controlling step: stopping the read-write operation to the memory card when it is judged that the cover is contacted, or the cover slides along the guiding slots on a card slot of the card reader; and
    a cover sliding step: sliding the cover of the card reader along the guiding slots on the card slot of the card reader.

10. The protection method according claim 9, wherein after the cover sliding step, the protection method further comprises:
    a memory card ejecting step: unlocking the memory card by a locking device arranged on the card slot, so as to eject the memory card.

11. The protection method according claim 10, wherein after the memory card ejecting step, the protection method further comprises:
    a cover returning step: pushing the locking device and the cover by the pressure of an elastic part arranged on the card slot, such that the cover returns along the guiding slots.

12. The protection method according claim 9, wherein the state judging step comprises:
    a capacitance detecting step: detecting the capacitance of a capacitive touch sensor via the metal shielded structure of the cover; and a state determining step: determining that the cover of the card reader is contacted when it is detected that the capacitance of the capacitive touch sensor is greater than a predetermined capacitance.

13. The protection method according claim 9, wherein the state judging step comprises:
    a voltage detecting step: detecting whether the voltage of the first contact point on the card reader changes; and
    a state determining step: determining that the cover slides along the guiding slots when it is detected that the voltage of the first contact point changes.

14. A card reader, comprising:
    a card slot having an accommodation space for accommodating a memory card, with parallel guiding slots being arranged on the left side and right side walls of the card slot;
    a cover arranged on the card slot and being slidable on the card slot via the guiding slots;
    a locking device arranged in the accommodation space and fixedly connected to the cover for locking or unlocking the memory card through sliding of the cover; and
    an elastic part having a longitudinal axis along which the elastic part is configured to deform, the elastic part arranged in the accommodation space with the longitudinal axis parallel with the guiding slots, one end of the elastic part being connected to the locking device and the other end of the elastic part being connected to the card slot.

* * * * *